United States Patent
Krishnaswamy et al.

(10) Patent No.: US 7,623,785 B2
(45) Date of Patent: Nov. 24, 2009

(54) DWDM OPTICAL NETWORK PLANNING METHOD

(75) Inventors: Murali Krishnaswamy, Piscataway, NJ (US); Sambasiva R. Bhatta, Tampa, FL (US)

(73) Assignee: Verizon Services Corp., Arlington, VA (US)

( * ) Notice: Subject to any disclaimer, the term of this patent is extended or adjusted under 35 U.S.C. 154(b) by 501 days.

(21) Appl. No.: 11/617,244

(22) Filed: Dec. 28, 2006

(65) Prior Publication Data

US 2008/0159742 A1    Jul. 3, 2008

(51) Int. Cl.
- H04B 10/08 (2006.01)
- H04J 14/00 (2006.01)
- H04L 12/26 (2006.01)
- H04L 12/28 (2006.01)

(52) U.S. Cl. .............. 398/58; 398/34; 398/48; 398/57; 398/74; 370/254; 370/255; 370/238

(58) Field of Classification Search .......... 398/25, 398/34, 46–48, 57, 58, 74, 75; 370/238, 370/254, 255, 258, 351
See application file for complete search history.

(56) References Cited

U.S. PATENT DOCUMENTS

| | | | |
|---|---|---|---|
| 6,233,074 | B1 | 5/2001 | Lahat et al. |
| 6,798,752 | B1 | 9/2004 | Pope |
| 7,088,920 | B2 | 8/2006 | Krishnaswamy et al. |
| 7,286,480 | B2 * | 10/2007 | Carpenter et al. ............ 370/238 |
| 2003/0099014 | A1 * | 5/2003 | Egner et al. ................. 359/124 |
| 2004/0221060 | A1 * | 11/2004 | Alicherry et al. ............ 709/238 |
| 2005/0232157 | A1 * | 10/2005 | Tyan et al. ................... 370/237 |

* cited by examiner

*Primary Examiner*—Dalzid Singh

(57) ABSTRACT

Various embodiments of the present invention are directed to a method for creating and optimizing a DWDM optical fiber network that is configured to service a set of demands associated with a region of interest. The method may include the following steps: 1) determining the highest aggregate demand from a set of demands within a region of interest; 2) determining a total number of lightpaths at discrete line granularities beginning with the highest aggregate demand; 3) determining a DWDM network topology comprised of a plurality of nodes and one or more wavelengths extending between the nodes based on the total number of lightpaths at discrete line granularities; 4) routing lightpaths along the wavelengths extending between the plurality of nodes based at least on predetermined decision criteria; 5) routing demands onto tributaries extending along the lightpaths based at least on predetermined guidelines; 6) calculating a cost associated with the node-related hardware parameters; and 7) outputting the node-related hardware parameters and the associated cost.

25 Claims, 7 Drawing Sheets

FIGURE 2

DWDM OPTICAL NETWORK PLANNING METHOD

BACKGROUND OF THE INVENTION

Optical fiber network planning refers to a broad spectrum of activities including determining where, when and how much new optical network capacity, i.e., carrier facilities, should be established or added to the network in order to meet a demand for services through the network. More particularly, network service providers should perform technology selection, equipment sizing, traffic grooming and routing, cost analysis, and other related operations.

The United States telecommunications industry currently relies largely on a synchronous optical networking technology known as a Synchronous Optical Network ("SONET"). SONET is referred to as synchronous technology because the exact rates that are used to transport data are tightly synchronized across the entire network by atomic clocks. This allows for a significant reduction in the amount of buffering required between each element of the network when compared to asynchronous optical fiber technologies. In addition, unlike asynchronous technologies that only connect two points in a direct link, SONET allows several points to be connected in multiple types of architectures, e.g., a ring, mesh or grid, etc. These architectures are desirable because they are "self-healing" in the event that a fiber optic cable is cut.

A second developing synchronous optical networking technology that also uses the above "self-healing" architectures is called Dense Wavelength Division Multiplexing ("DWDM"). In DWDM, multiple colors of light are passed through a single fiber optic strand, thus permitting multiple signals through that fiber strand. This increases the capacity of each fiber optic strand as compared to prior network technologies such as SONET. DWDM networks also allow individual wavelengths of light to carry different types of data traffic, such as for example, SONET traffic, Ethernet traffic, Fibre Channel, etc. DWDM wavelengths can also carry traffic at different rates, such as for example, OC-48 (2.5 Gbps), OC-192 (10 Gbps), etc. DWDM networks need not be terminated (i.e., converted from optical signals to electrical signals and then back again) at intermediate optical network nodes as is required by prior technologies such as SONET.

Given the many benefits and increasing demand for DWDM network technologies, it would be desirable to provide tools, systems, and methods for DWDM network planning and resource optimization.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is an illustration of exemplary OADM product information used in connection with various embodiments of the invention;

DETAILED DESCRIPTION

Figure 1:
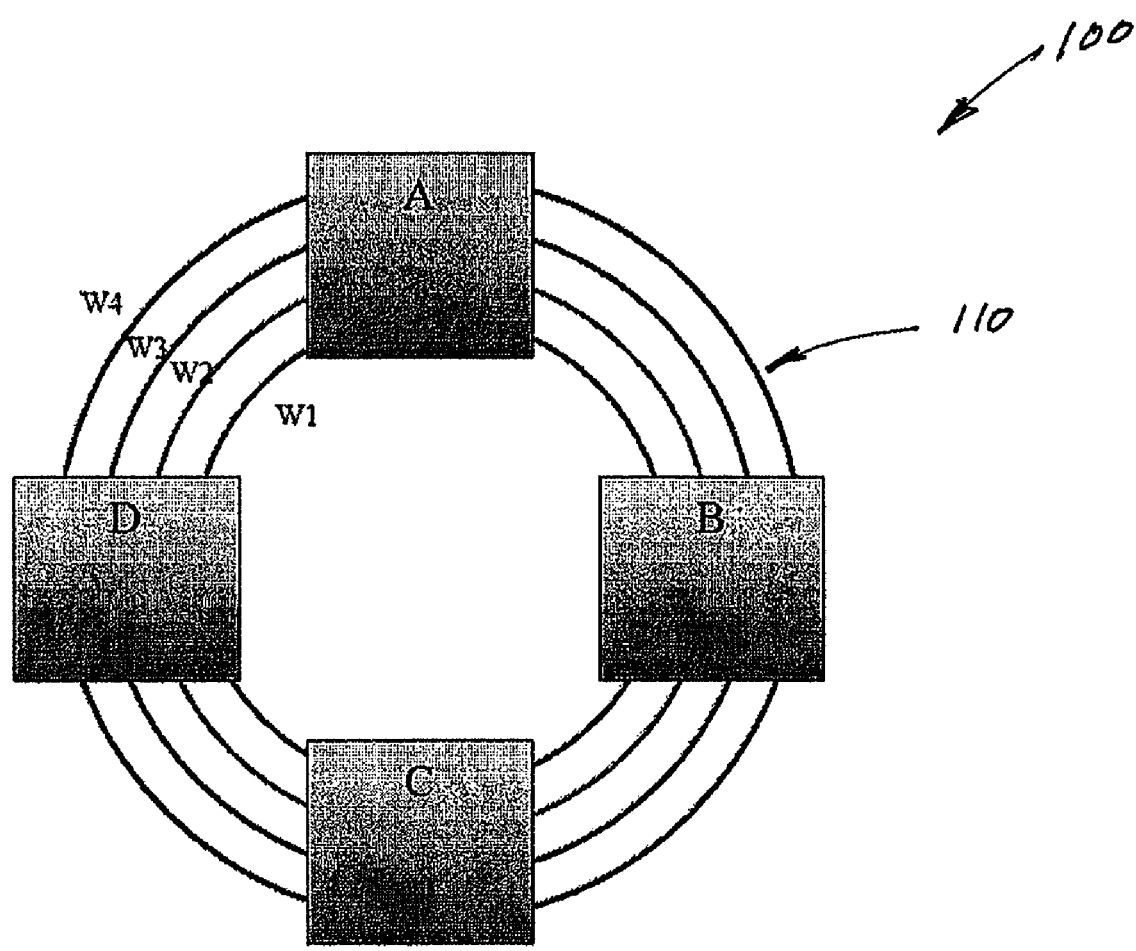
FIG. 1 is a schematic exemplary illustration of a DWDM ring network.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Various embodiments of the present invention are directed to a DWDM network planning tool, system, and method for creating, organizing, maintaining and optimizing a DWDM optical fiber network that is configured to service a set of demands associated with a region of interest. As will be apparent in view of this disclosure, the tools, systems, and methods recited herein may be used by DWDM network planners or service providers to setup, configure, maintain, and optimize DWDM optical fiber networks. Such tools, systems, and methods may also be employed upon the occurrence of specific events (i.e., the addition or removal of customers, demands, etc.) or at predetermined time intervals to maintain and optimize the capacity and configuration of the optical fiber network during service. For purposes of the foregoing specification and appended claims the term "network planning" shall refer to a broad array of activities including without limitation network design activities, network creation activities, budgeting activities, network routing, network capacity analysis, network maintenance activities, network demand servicing, network hardware planning, network software planning, network resource optimization, network cost optimization, and other similar activities.

DWDM fiber strands transmit data by passing optical signals comprised of multiple colors of light at discrete wavelengths within a designated frequency band. The optical signals undergo multiplexing whereby multiple optical signals are transformed at a transmitting end into a single complex signal and then recovered into separate signals at a receiving end. For purposes of the present specification and appended claims the term "DWDM" shall include a variety of multiplexing technologies including without limitation wavelength division multiplexing, coarse wavelength division multiplexing, dense wavelength division multiplexing, and re-configurable optical add/drop multiplexing as are known in the art.

Optical signals may be added or dropped from a DWDM network at nodes having at least one optical add/drop multiplexer ("OADM"). A connection between two OADMs is referred to as a lightpath (also commonly referred to as an "Optical Channel connection"). As discussed in greater detail below, multiple lightpaths may exist between two OADMs and a single demand tributary of a given traffic rate may traverse multiple lightpaths on different wavelengths. Further, multiple demand tributaries of a given traffic rate may be combined to traverse a selected lightpath.

DWDM network architectures are established by DWDM network service providers to allow customers the ability to transmit data from one geographic location to another. Customers may select a traffic rate or bit rate for such transmissions (e.g., DS0, DS3, OC01, OC03, OC12, GigE, OC192, etc.) or the nature of the data may dictate a lowest acceptable traffic rate (e.g., telephone, video conference services, etc.). Traffic between nodes is referred to herein as a "demand" or as a "set of demands." Demands typically include a source node, a destination node, a traffic rate, and a protection scheme.

DWDM network service providers offer customers multiple protection schemes on a per wavelength basis. Such protection schemes may include traditional SONET protection schemes (e.g., UPSR, 2BLSR, etc.) or optical protection schemes. Optical protection schemes include dedicated protection ring protection ("DPRING protection") and optical shared protection ring protection ("OSPRING protection"). DPRING protection uses two fibers with counter-flowing (or counter-routed) traffic to protect every demand by allocating a main path along one side of the ring and a dedicated back-up path along the other side of the ring. When a link or node failure occurs within the ring, the network receiver switches to the demand traffic provided on the back-up or protection path. OSPRING uses two or four fibers with counter-flowing (or counter-routed) traffic and reserves half of the fiber capacity for protection purposes. That is, each working wavelength has a dedicated protection wavelength reserved for it. Half of the capacity can be used as working capacity and non-overlapping connections can be assigned on the same wavelength and benefit by sharing their protection capacity. When a link or node failure occurs, protection switching occurs on a wavelength basis by switching to the protection capacity available on a fiber routed in the opposite direction. When selecting network services, customers may select SONET protection schemes, DPRING protection, OSPRING protection, or no protection at all.

DWDM network planners establish regional DWDM network architectures based on a set of demands associated with a selected geographic region or "region of interest." This set of demands may include customer demands, telecommunication carrier demands, and/or other demands that have source and/or destination locations within the region of interest. An individual demand may include, for example, the following: Source Node: A; Destination Node: B; Traffic Rate: 10 DS-0, 2 DS-3, 3 OC-12, and 6 GigE; and Protection Scheme: DPRING. One of the goals of DWDM network planning is to ensure that demands present within a region of interest are satisfied (i.e., routed) via a network that is configured as efficiently as possible.

In this regard, various embodiments of the present invention are directed to a method for creating and/or configuring a DWDM optical fiber network that is configured to service a set of demands associated with a region of interest. The method may include the following steps: 1) determining the highest aggregate demand from a set of demands within a region of interest; 2) determining a total number of lightpaths at discrete line granularities beginning with the highest aggregate demand; 3) determining a DWDM network topology comprised of a plurality of nodes and one or more wavelengths extending between the nodes based on the total number of lightpaths at discrete line granularities; 4) routing lightpaths along the wavelengths extending between the plurality of nodes based at least on predetermined decision criteria; 5) routing demands onto tributaries extending along the lightpaths based at least on predetermined guidelines; 6) calculating node-related hardware parameters based at least on a predetermined routine; 7) calculating a cost associated with the node-related hardware parameters; and 8) outputting the node-related hardware parameters and the associated cost. For purposes of the forgoing specification and appended claims the term "outputting" refers without limitation to: transmitting a result to a user display, storing a result to memory, transmitting a result to a remote device, and/or other similar operations.

Determining the Highest Aggregate Demand

DWDM optical fiber network planning methods structured in accordance with various embodiments of the present invention may begin by determining the highest aggregate demand $D_{high}$ from a set of demands associated with a region of interest. The first step in determining the highest aggregate demand $D_{high}$, is to calculate the aggregate demand $D_A$ between each source and destination location (i.e., node pair) in the region of interest. Notably, the aggregate demand $D_A$ between a node pair is the sum of the protection level demands $D_u$, $D_s$, $D_d$, which are calculated separately for unprotected, OSPRING, and DPRING demands, respectively. For purposes of such calculations, the SONET protection scheme UPSR (Unidirectional Path Switched Ring) shall be considered equivalent to the DPRING protection scheme and the SONET protection scheme BLSR (Bidirectional Line Switched Ring) shall be equivalent to the OSPRING protection scheme. Unprotected SONET demands shall be considered equivalent to unprotected DWDM demands.

To determine the aggregate demand $D_A$ between a node pair in accordance with various embodiments of the invention, the demands associated with the node pair are normalized or rewritten in a single traffic rate format using the conversion information provided in Table 1 below. In one embodiment, for example, the demands are normalized in an OC48 traffic rate format. In other embodiments, the demands associated with a node pair may be normalized in a traffic rate other than OC48 (e.g., OC03, OC12, etc.).

TABLE 1

| Optical Traffic Rate | Number Needed | Equivalent Opt. Traffic Rate |
|---|---|---|
| DS0 | 24 (or part thereof) | = DS1 |
| DS1 | 28 (or part thereof) | = DS3 |
| DS3 | 3 (or part thereof) | = OC03 |
| OC01 | 3 (or part thereof) | = OC03 |
| OC03 | 16 (or part thereof | = OC48 |
| OC12 | 4 (or part thereof) | = OC48 |
| GigE | 2 (or part thereof) | = OC48 |
| OC192 | 1 | = 4 OC48 |
| OC768 | 1 | = 16 OC48 |

In one embodiment, low order traffic rates (e.g., DS0, DS1, OC01, etc.) are aggregated in an orderly manner to obtain the required number of OC03 rates, which can then be readily converted into the number of OC48 rates. Mid-level traffic rates (e.g., OC03, OC12, GigE, etc.) and high order traffic rates may be converted directly into OC48 rates as shown. Once converted into an OC48 traffic rate format, each term of the demands may be added or "aggregated" to produce a total number of normalized demands $D_{nor}$, i.e., the sum of the demands rewritten in OC48 format.

Normalized demands exist for each protection level in the demand set. For example, a set of OSPRING demands between a node pair may be provided as follows: $D_s$=18 OC03, 3 GigE, 3 OC48, and 1 OC192. This OSPRING demand set could be rewritten in an OC48 traffic rate format as: $D_s$=2 OC48, 2 OC48, 3 OC48, and 4 OC48. When totaled, this normalized OSPRING demand $D_{s/nor}$ is equal to 11 OC48 or 11.

As noted above, a set of demands between a node pair may have three optical protection schemes. Each protection level demand $D_u$, $D_s$, $D_d$ should be calculated separately before the aggregate demand $D_A$ may be determined. In accordance with various embodiments of the invention, a "weight factor" is applied for various protected demand sets. This "weight factor" accounts for the additional bandwidth requirements needed for the different protection schemes. For example, OSPRING protection requires one protection wavelength for every working wavelength and, thus, is assigned a weight factor of 2. There can be only one lightpath in a DPRING wavelength as the other segments of the wavelength form the protection path. Thus, a significant portion of fiber resources are used for DPRING protection. This additional resource usage dictates a weight factor of 4 for DPRING protection. In view of the above, protection level demand $D_s$ is equivalent to two multiplied by $D_{s/nor}$ (i.e., $D_s=2*D_{s/nor}$) and protection level demand $D_d$ is equivalent to four multiplied by $D_{d/nor}$ (i.e., $D_d=4*D_{d/nor}$).

As noted above, the aggregate demand $D_A$ between a pair of nodes is the sum of the protection level demands and, thus, in accordance with various embodiments of the invention may be expressed as follows:

$$D_A = D_u + D_s + D_d = D_{u/nor} + 2*D_{s/nor} + 4*D_{d/nor}$$

Once an aggregate demand value is determined for each node pair within the region of interest, the collective aggregate demands are compared so that the highest aggregate demand $D_{high}$ may be selected. For example, node pairs within a region of interest may have aggregate demands as follows: $D_{A1}$=24 OC48; $D_{A2}$=30 OC48; $D_{A3}$=12 OC48; and $D_{A4}$=18 OC48. The highest aggregate demand $D_{high}$ for this exemplary region of interest would be 30 OC48. As discussed in greater detail below, lightpaths may be set up in accordance with various embodiments of the present invention in an order beginning with the highest aggregate demand $D_{high}$ and continuing to the next highest aggregate demand, and so on until the demands have been routed.

In accordance with the invention, it may be helpful to determine first an estimated number of wavelengths ("$W_{est}$") that may be needed for a DWDM ring to service a set of demands associated within a region of interest. In one embodiment, the estimated number of wavelengths $W_{est}$ may be determined, at least in part, based on the highest aggregate demand $D_{high}$ for the region of interest. Table 2 below provides an exemplary illustration of a method for determining an estimated number of wavelengths $W_{est}$ needed to service a demand set in accordance with one embodiment of the invention.

TABLE 2

| $D_{high}$ Relationship | Estimated No. of Wavelengths ($W_{est}$) |
|---|---|
| $D_{high} \leq 4$ OC48 | 8 DWDM wavelengths |
| 4 OC48 < $D_{high} \leq 32$ OC48 | 16 DWDM wavelengths |
| 32 OC48 < $D_{high} \leq 64$ OC48 | 32 DWDM wavelengths |
| $D_{high} > 64$ OC48 | 64 DWDM wavelengths |

Determining the Number and Granularity of Lightpaths

FIG. 1 is a simple illustration of a DWDM ring architecture consisting of nodes A-B-C-D connected along a continuous, or looped, optical path 110. Although a ring-type architecture is shown, methods structured in accordance with various embodiments of the invention may be employed to create and optimize mesh or chain-type DWDM optical network architectures. For illustration purposes, the optical path between each node in FIG. 1 is shown having four wavelengths (W1, W2, W3, W4); however, as is known in the art, actual optical fiber paths between nodes would include far more wavelengths (e.g., 16, 32, 64 wavelengths, etc.). Further, although FIG. 1 depicts only a single optical path 110 between nodes, two or more optical paths between nodes may be provided, some of which may be reserved for protection or control channels.

Lightpaths are set up over wavelengths in a DWDM optical network. As noted above, DWDM network wavelengths configured to have a specific protection scheme based on the traffic or demands that are expected to be carried on that wavelength. For example, W1 of FIG. 1 could be set for unprotected, OSPRING, or DPRING demands. For OSPRING and unprotected wavelengths, there can be multiple lightpath connections over the same wavelength, provided that such lightpaths are set at the same optical protection level (i.e., unprotected or OSPRING). However, DWDM network planners typically allocate the full capacity (i.e., up to the full optical traffic rate) of each wavelength for OSPRING protection schemes. Only one lightpath can be set up in each DPRING wavelength.

The optical traffic rate for each lightpath is based on the OADM interface card selected by the DWDM network planner. OADM interface cards are provided at each node for accepting customer signals on one side (i.e., the drop side or low-speed side) and transmitting such signals to other network nodes over a selected wavelength on the other side (i.e., the line side). There can also be configurations consisting of separate interface cards for customer signals and network traffic. FIG. 2 provides an exemplary OADM Equipment and Cost Template 200 illustrating a variety of factors that are considered by OADM network planners as they select OADM interface cards and thereby establish the necessary line granularity (i.e., traffic rate) for various lightpaths in order to service the demands in a particular region of interest. The costs, values, and options listed in FIG. 2 are provided for illustration purposes only and could vary significantly based on the type of OADM technology, the OADM vendor, and the OADM manufacturer, etc.

The OADM Equipment and Cost Template shown in FIG. 2 includes a variety of exemplary fields that are briefly described below. Reference numbers are provided adjacent to these exemplary fields consistent with those illustrated in FIG. 2. In practice, selected fields may be enabled or disabled in a graphic user interface display depending on the specific OADM product being considered.

Base Cost Field 205: Field that indicates the base cost for the OADM product before additional features (e.g., optical amplifiers, interface cards, etc.) have been added.

Common Cost Fields 210: Fields that indicate various costs for additional hardware associated with a specific OADM product. As noted in FIG. 2, the relative cost of such hardware may vary depending upon whether the OADM is configured to support 16, 32, or 64 wavelengths, etc.

Number of Wavelengths Supported Field 220: Field that indicates the minimum and maximum number of wavelengths that may be supported by a particular OADM product. Field also includes the total number of interface cards that may be supported by the OADM product.

Protection Scheme Supported Field 230: Field that indicates the types of protection scheme formats that are supported by the OADM product. Notably, the depicted OADM product supports both DWDM optical protection schemes (e.g., OSPRING and DPRING) as well as SONET protection schemes (e.g., UPSR, 2BLSR, etc.). However, as is known, a given OADM installation typically uses only one protection scheme.

Interface Card Input Rate Field 240: Field indicates the input traffic rate for each port on the drop or low speed side of the OADM interface cards supported by the OADM product.

Lightpath Rate Field 250: Field indicates the output lightpath traffic rate for lightpaths supported by each OADM interface card.

Card Cost 260: Field indicates the cost of each OADM interface card supported by the OADM product.

Number of Ports per Card 270: Field indicates the maximum number of ports provided on the drop or low speed side of the OADM cards supported by the OADM product.

Maximum Number of Cards 280: Field indicates the maximum number of OADM interface cards of a given type that are supported by the OADM product.

Various embodiments of the present invention include a step for determining the total number of lightpaths and line granularities (i.e., traffic rates) needed to service a set of demands associated with the region of interest. In one embodiment, this step begins with a determination of the total number of lightpaths and line granularities associated with the node pair having the highest aggregate demand $D_{high}$ as determined above. If there is a tie (i.e., two node pairs have the highest aggregate demand $D_{high}$), then the node pair with the shortest span (i.e., physical distance between the source and destination locations) is selected. The selected node pair is referred to herein as the "selected pair". In one embodiment, the protection level demands $D_u$, $D_s$, $D_d$ for the selected pair are compared and the highest protection level demand ($D_u$, $D_s$, or $D_d$) is selected. The selected protection level demand ($D_u$, $D_s$, or $D_d$) is used in connection with OADM product information of the type illustrated in FIG. 2 as described in greater detail below.

In a hypothetical scenario, let us say that $D_s$ is the highest protection level demand for the selected node pair. In this example, the OSPRING demand $D_s$ equals 18 OC03, 3 GigE, 3 OC48, and 1 OC192. Notably, each traffic rate (e.g., 18 OC03) listed in a set of demands includes a quantity (i.e., 18) and a rate (i.e., OC03). The "quantity" corresponds to the number of data streams needed at a particular traffic rate to service a set of demands. Said differently, as discussed in detail below, the "quantity" corresponds to the number of drop ports that will be required in order to service demands of a particular traffic rate.

The first exemplary traffic rate of $D_s$ is 18 OC03, thus, suggesting that an interface card or set of cards should be installed into the OADM having an input rate of OC03. The quantity of the selected traffic rate, namely, 18, suggests that 18 input ports should be available on the card or set of cards to fully service the selected demand. Turning to the Number of Ports per Card Field 270 shown in FIG. 2, we note that the OC03 interface card includes 16 ports at each lightpath line granularity (i.e., OC48, OC192, OC768). 18 ports are required for the selected demand and, thus, a single OC03 card will not suffice. In one embodiment, two OC03 cards may be selected each having a lightpath line granularity of OC48. Based on the cost information depicted in FIG. 2, the total cost for such a selection would be $40,000.

The second traffic rate of the selected demand is 3 GigE, thus, suggesting that an interface card or set of cards should be provided in the OADM having an input traffic rate of GigE. The quantity (3) suggests that 3 input ports should be available on the card or set of cards to receive the selected demand. A review of the exemplary information provided in FIG. 2 suggests that a single card configured for an OC48 lightpath line granularity would be insufficient to service a 3 GigE demand (i.e., only two ports available per card). Thus, in one embodiment, two GigE cards configured for an OC48 lightpath line granularity may be selected. Alternatively, in another embodiment, one GigE card that is configured to have an OC192 lightpath line granularity may be selected. A potential drawback for the second option is that its cost (i.e., $55,000) exceeds that of the first option (i.e., $40,000). However, if additional demands are expected, the second option may indeed be preferred as it would provide additional GigE traffic rate capacity. Selecting one GigE card having an OC192 lightpath line granularity could provide an additional benefit of using only one of the OADM's card slots (as opposed to two slots if two GigE cards were selected having an OC48 lightpath line granularity) thereby leaving the OADM with a greater card receiving capacity.

The third traffic rate of the selected demand is 3 OC48, thus, suggesting that an interface card or set of cards should be installed in the OADM having an input traffic rate of OC48. The quantity (3) suggests that 3 input ports should be available on the card or set of cards to receive the selected demand. A review of FIG. 2 suggests that a single card configured for an OC48 lightpath line granularity would be insufficient to service a 3 OC48 demand (i.e., only one port available per card). Thus, in one embodiment, three OC48 cards that are configured for an OC48 lightpath line granularity may be selected. Alternatively, in another embodiment, one OC48 card configured to have an OC192 lightpath line granularity may be selected. As noted above, the second option would come at a great cost but could provide greater future OC48 traffic rate capacity.

The fourth traffic rate of the selected demand is 1 OC192, thus, suggesting that an interface card or set of cards should be installed in the OADM having an input traffic rate of OC192. The quantity (1) suggests that 1 input port should be available on the card or set of cards to receive the selected demand. A review of the exemplary information provided in FIG. 2 suggests that a single card configured for an OC192 lightpath line granularity would be sufficient to service a 1 OC192 demand (i.e., one port is available per card). Thus, in one embodiment, one OC192 card configured for an OC192 lightpath line granularity may be selected. Alternatively, in another embodiment, one OC192 card configured for an OC768 lightpath line granularity may be selected. As noted above, the second option would come at a greater cost but could provide greater future OC192 traffic rate capacity.

In accordance with various embodiments of the invention, once the total number of lightpaths needed at various lightpath line granularities have been selected to service the highest protection level demand (i.e., $D_s$), the above lightpath selection process is repeated with the other protection level demands (i.e., $D_u$ or $D_d$) associated with the selected node pair (i.e., the node pair having the highest aggregate demand $D_{high}$). Once the total number of lightpaths needed at various lightpath line granularities have been selected for the selected node pair, the process is then applied to the node pair having the next highest aggregate demand $D_A$. This process continues until the node pairs have been processed on a highest-aggregate demand-first basis.

Determining DWDM Ring Topology

Still further embodiments of the invention involve a step for determining the topology of the DWDM optical fiber network. The total number of lightpaths configured at various lightpath line granularities that are needed to service a set of demands associated with a region of interest, as determined above, is used in accordance with the present invention to determine the DWDM network topology. Various algorithms and/or computer implemented processes exist and may be used to create a DWDM ring topology. For example, commonly-owned U.S. Pat. No. 6,798,752 discloses one such system and is thus incorporated by reference herein in its entirety. Another such system is disclosed in a commonly owned patent application entitled Method and System for Determining a Network Topology, which was filed concurrently with the present application and is hereby incorporated by reference in its entirety.

Setting Up the Lightpaths

Once the topology of the DWDM ring network is established, the path or route between nodes for each lightpath should be determined. In accordance with various embodiments of the present invention, a Routing and Wavelength Algorithm ("RWA") is used to select paths or routes between nodes for each lightpath. The RWA selects a path and wavelength for a given lightpath based on the relative weight given to various decision criteria. For purposes of illustrating the principles of the invention, the decision criteria used to select optimal paths and wavelengths between nodes for servicing demands may include the following: path length, in-service wavelengths, utilization rate, fragmentation, load balancing, and lower wavelength preference. Each of these criteria will now be briefly defined.

The first criterion, the path length, refers to the number of segments or links over which a lightpath extends. In a ring network, there are two paths that may be selected, clockwise and counterclockwise, and generally the shortest path will be preferable. A few exemplary advantages to using the shortest path include: a larger (remaining) portion of the selected wavelength is available for future connection requests; since the shortest path traverses fewer nodes there is less chance of a failure; and the optical power requirements are less for the shorter connection.

The second criterion, in-service wavelengths, refers to a preference for selecting a wavelength that is already being used in the network instead of selecting a wavelength that is currently not being used in the network. Notably, this preference may result in the selection of the longer path between a node pair for lightpath setup. This criterion is generally important because some optical protection schemes like DPRING require full wavelength availability over the entire ring. If a new wavelength were used for each (non-DPRING) connection, fewer possible DPRING-like services could be accommodated in the future.

The third criterion, the utilization rate of a given wavelength, refers to the ratio of the number of links over which a given wavelength is in use relative to the total number of links in the network. A wavelength with a higher utilization rate will generally be preferable to a wavelength with a lower utilization rate because it is prudent to fully utilize one wavelength before going to the next one.

The fourth criterion, the fragmentation of each wavelength, is defined as the summation of the number of contiguous links that are in service and the number of contiguous links that are not in service for the given wavelength. Generally, a wavelength with a lower fragmentation is preferable because a highly fragmented wavelength cannot accommodate new connections that traverse many nodes, i.e., a relatively long path.

The fifth criterion, load balancing, is defined as a preference for a lightpath direction (i.e., clockwise or counterclockwise) in which there are fewer lightpath connections when two equal cost path lightpaths are provided (i.e., same number of optical hops) between two nodes.

The sixth criterion, lower wavelength preference, is defined as a preference for routing a lightpath on the lower numbered wavelength after confirming that each of the above five criteria is not applicable.

It should be noted that the aforementioned decision criteria are exemplary and that the present invention encompasses the use of any decision criteria that are available.

Figure 3:
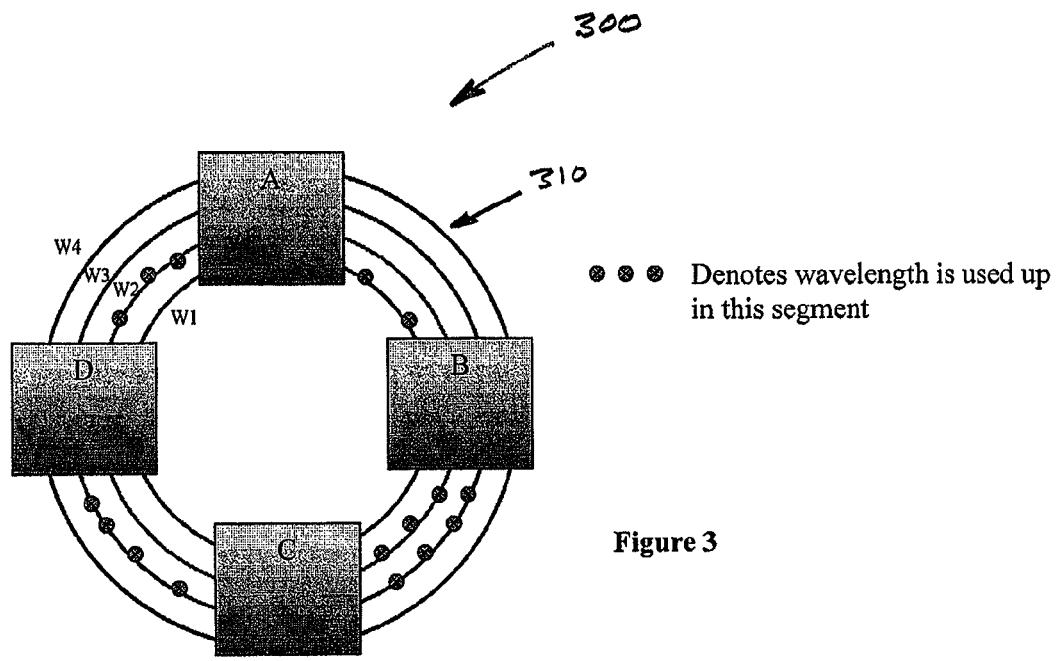
FIG. 3 is a schematic illustration of a DWDM ring network, which is used to illustrate selected decision criteria.

FIG. 3 illustrates an exemplary DWDM ring network 300 so that various decision criteria related to lightpath selection in accordance with various embodiments of the invention may be illustrated. Ring network 300 includes nodes A-B-C-D, which are connected by a single optical path 310. As shown, optical path 310 supports wavelengths W1, W2, W3, and W4. The four wavelengths are available to provide service along any links of the optical path 310, except that wavelength W1 is unavailable on the links between nodes A-B, wavelength W2 is unavailable on the links between nodes B-C and D-A, and wavelength W3 is unavailable on the links between nodes B-C, and C-D.

If we assume that a lightpath is to be established between nodes A and B, the second decision criteria suggests that we select between wavelengths W2 and W3 (W4 is not currently used and W1 is unavailable). The third decision criterion does not break the tie between wavelengths W2 and W3 as each is used in two segments. The fourth decision criterion would select wavelength W3 because it is used in more consecutive segments and, thus, discourages fragmentation.

Figure 4:
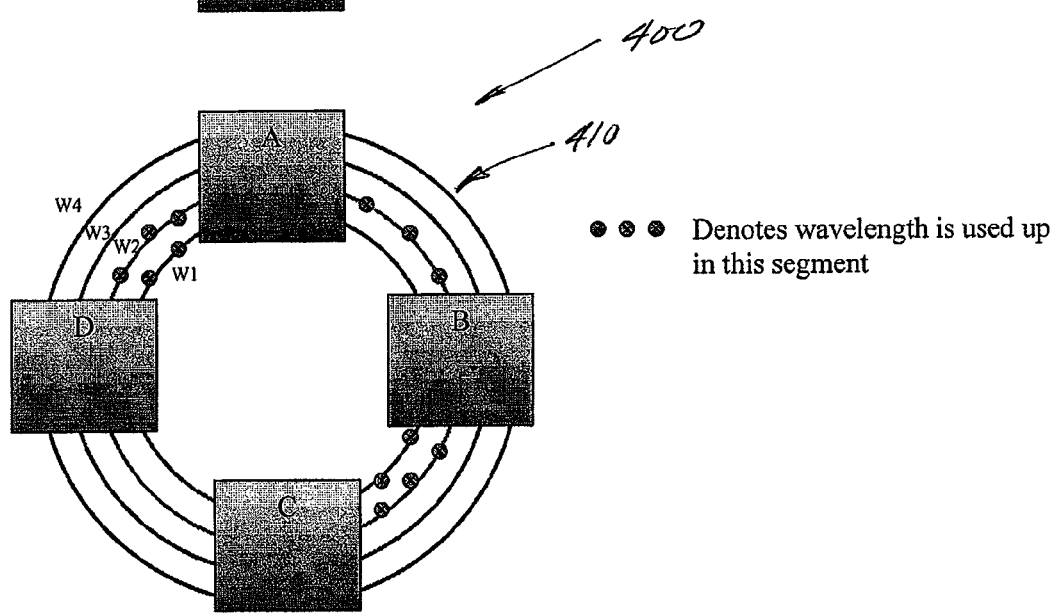
FIG. 4 is a schematic illustration of a DWDM ring network, which is used to illustrate further selected decision criteria.

FIG. 4 illustrates yet another exemplary DWDM ring network 400 so that additional decision criteria related to lightpath selection in accordance with embodiments of the invention may be illustrated. Ring network 400 again includes nodes A-B-C-D, which are connected by a single optical path 410. As shown, optical path 410 supports wavelengths W1, W2, W3, and W4. The four wavelengths are available to provide service along any links of the optical path 410, except that W1 is unavailable on the links between nodes B-C and D-A, and W2 is unavailable between nodes A-B, B-C, and D-A.

If we assume that a lightpath is to be established between nodes A and C, we are forced to choose between wavelengths W3 and W4 as wavelengths W1 and W2 are not available. We should also choose which direction A-B-C or A-D-C in which to setup the lightpath. The fifth decision criterion suggests that A-D-C be selected as the direction for the lightpath because A-B-C currently uses three segments while A-D-C currently uses only two segments. The sixth criterion suggests that we select W3 as the wavelength due to a preference for its lower number (i.e., W3 vs. W4).

Setting Up Demands as Tributaries on Lightpaths

In various embodiments of the invention, once the RWA is used to select the path or route between nodes for each lightpath, the actual demands are set up as tributaries (e.g., SONET, GigE, Fiber Channel, etc.) on lightpaths. In one embodiment, this step comprises setting up first the demands associated with the lightpath having the highest line rate granularity. Among the multiple demands associated with a selected lightpath, tributaries for the highest demand are considered first. In some cases, lower order demands are aggregated into a higher order tributary.

In one embodiment of the invention, tributary connections between two nodes are determined by a Routing and Timeslot Assignment Algorithm based on certain guidelines. Non-limiting examples of such tributary connection guidelines include: 1) tributary connections between two nodes can be routed through multiple wavelengths; 2) where multiple tributary connections between two nodes are possible, choose the one with the lowest "optical" hop length, i.e., a tributary connection along one longer lightpath is preferred over several short hop lightpaths; 3) where several multi-optical-hop lightpaths are available, use one with the same wavelength or with fewer wavelengths; 4) where several equal optical-hop lightpaths are available, use the one with maximum wavelength usage; and 5) select the lightpath that is filled up most, with earlier demands.

Figure 5:
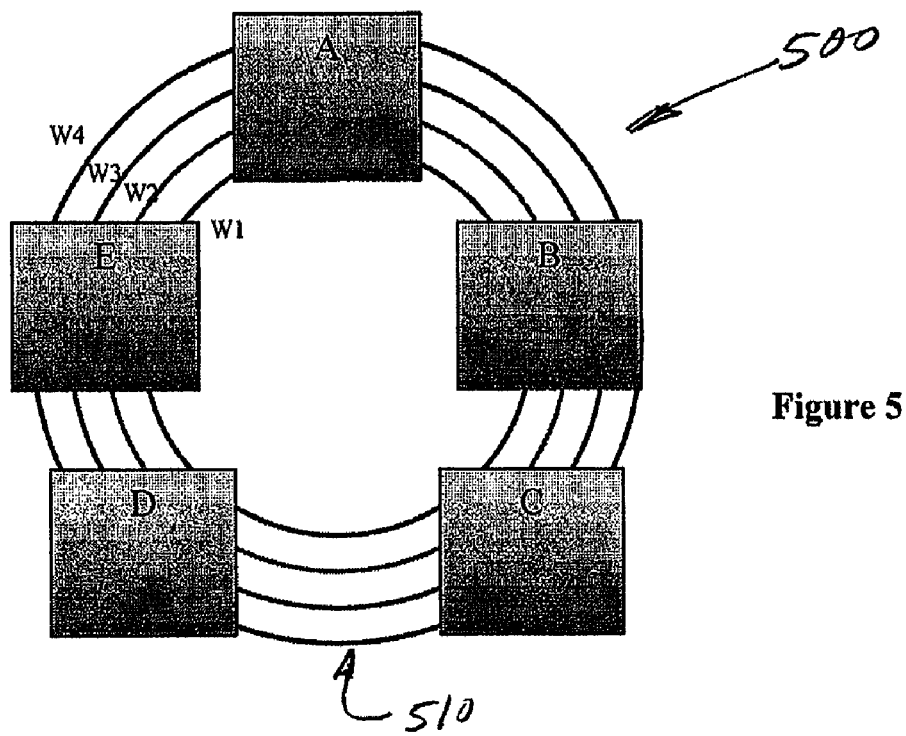
FIG. 5 is a schematic illustration of a DWDM ring network, which is used to illustrate predetermined tributary routing guidelines.

FIG. 5 illustrates yet another exemplary DWDM ring network 500 so that a selected group of the tributary decision guidelines noted above may be illustrated. Ring network 500 includes nodes A-B-C-D-E, which are connected by a single optical path 510. As shown, optical path 510 supports wavelengths W1, W2, W3, and W4. A lightpath exists on W1 through nodes A-E-D-C. However, nodes D and E are optically transparent to the lightpath on wavelength W1. Said differently, the lightpath on wavelength W1 is configured to optically bypass nodes D and E such that these nodes do not provide a location at which data may be added or dropped from wavelength W1 of the optical network. A lightpath also exists on wavelength W1 between nodes A and B, and another lightpath exists on wavelength W1 between nodes B and C.

If we assume that a demand tributary connection is to be established between nodes A and C, we note that there are two available paths for routing the tributary connection, namely, path A-B-C and path A-E-D-C. Although containing a greater number of nodes, guideline 2 suggests that we select connection path A-E-D-C because of its shorter "optical" hop length (i.e., nodes E and D are optically transparent).

Figure 6:
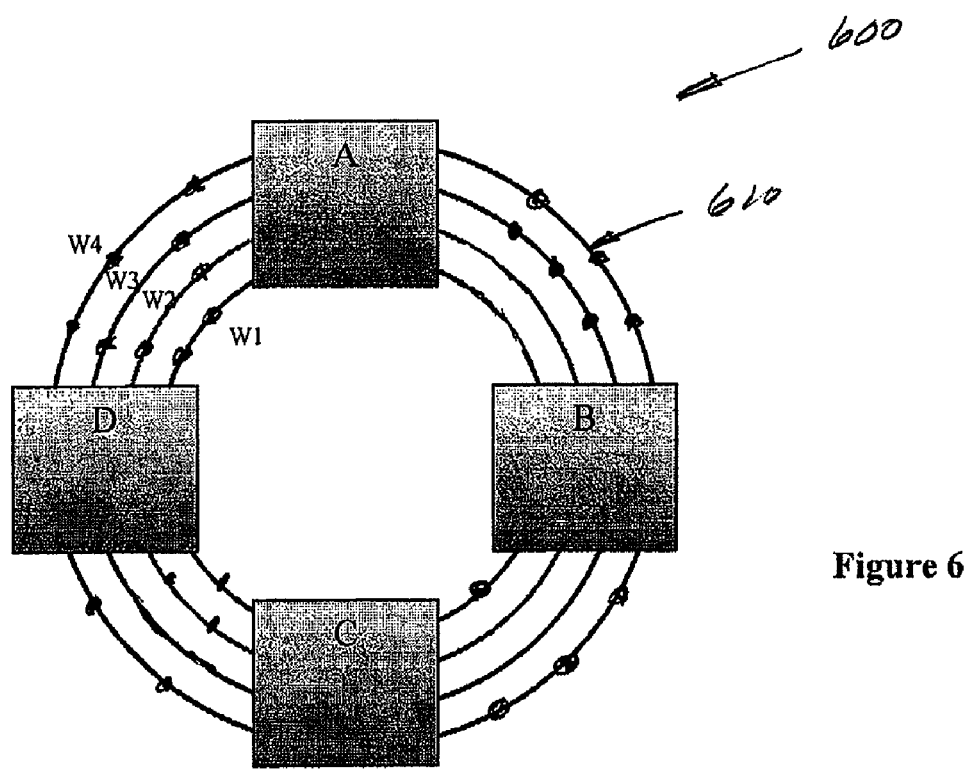
FIG. 6 is a schematic illustration of a DWDM ring network, which is used to illustrate further predetermined tributary routing guidelines.

FIG. 6 illustrates yet another exemplary DWDM ring network 600 so that a selected group of the tributary decision guidelines may be illustrated Ring network 600 includes nodes A-B-C-D, which are connected by a single optical path 610. As shown, optical path 610 supports wavelengths W1, W2, W3, and W4. Only five lightpath segments are available to provide service along any links of the optical path, wavelengths W1 and W2 are available in the links between nodes A-B, wavelengths W2 and W3 are available in the links between nodes B-C, and wavelength W3 is available in the link between nodes C-D. If we assume that a demand tributary is to be established between nodes A and C, guideline 4 suggests that we prefer the combination of paths on wavelength W2 between nodes A-B and B-C over other combination paths such as: the path between A-B on wavelength W1 and B-C on wavelength W2; the path between A-B on wavelength W1 and B-C on wavelength W3; or the path between A-B on wavelength W2 and B-C on wavelength W3.

Computation of OADM Hardware Parameters

In various embodiments of the invention, once tributaries for each demand are set up on lightpaths between the nodes in a region of interest, the OADM equipment needed to service each node of the network is selected. The selection of OADMs in accordance with this embodiment comprises three steps: 1) calculation of the number of ports; 2) calculation of the Network Interface Cards (NICs); and 3) calculation of the number of OADMs.

As noted above in the discussion related to FIG. 2, the number of ports needed for the discrete traffic rates of each demand set may be determined by the "quantity" associated with a given traffic rate. This "quantity" may be compared in accordance with various embodiments of the present invention to the exemplary information provided in the OADM Equipment and Cost Template illustrated in FIG. 2. In this regard, the number of ports required to service a set of demands for each traffic rate in a region of interest may be determined as described above. Once the number of ports is determined for each traffic rate, the total number of interface cards may be computed by dividing the number of ports required to service the demands of a particular traffic rate by the number of ports supported by an interface card configured for the selected traffic rate (as shown, for example, at reference number 280 of FIG. 2). Thus, for a hypothetical traffic rate A ("TRA"), the total number of interface cards ("ICs") may be computed as follows:

# of ICs (for TRA)=(# of ports required for TRA)/
(# of ports per card)

Figure 7:
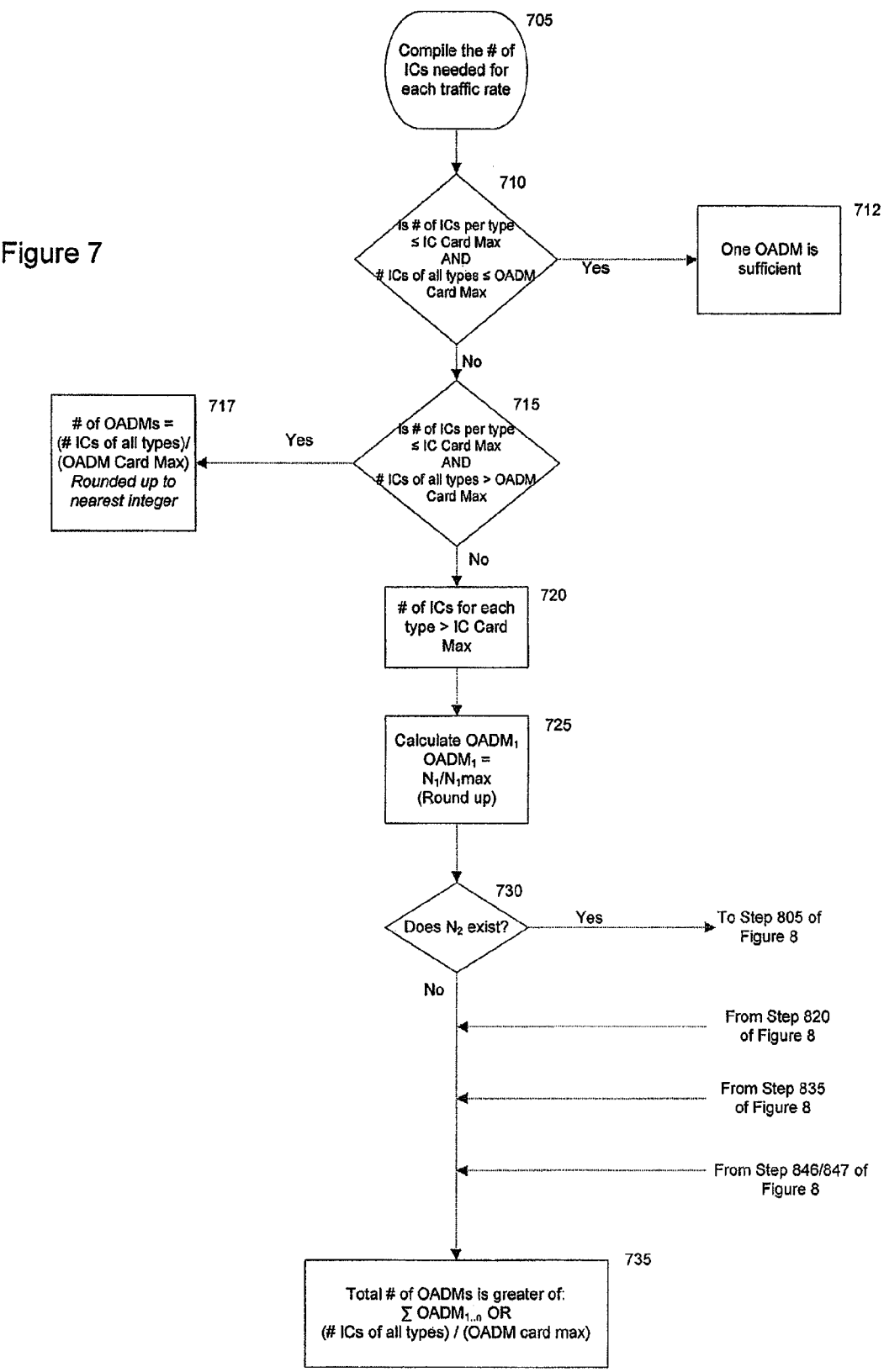
FIG. 7 is a schematic flow diagram illustrating an OADM calculation routine structured in accordance with one embodiment of the invention.
Figure 8:
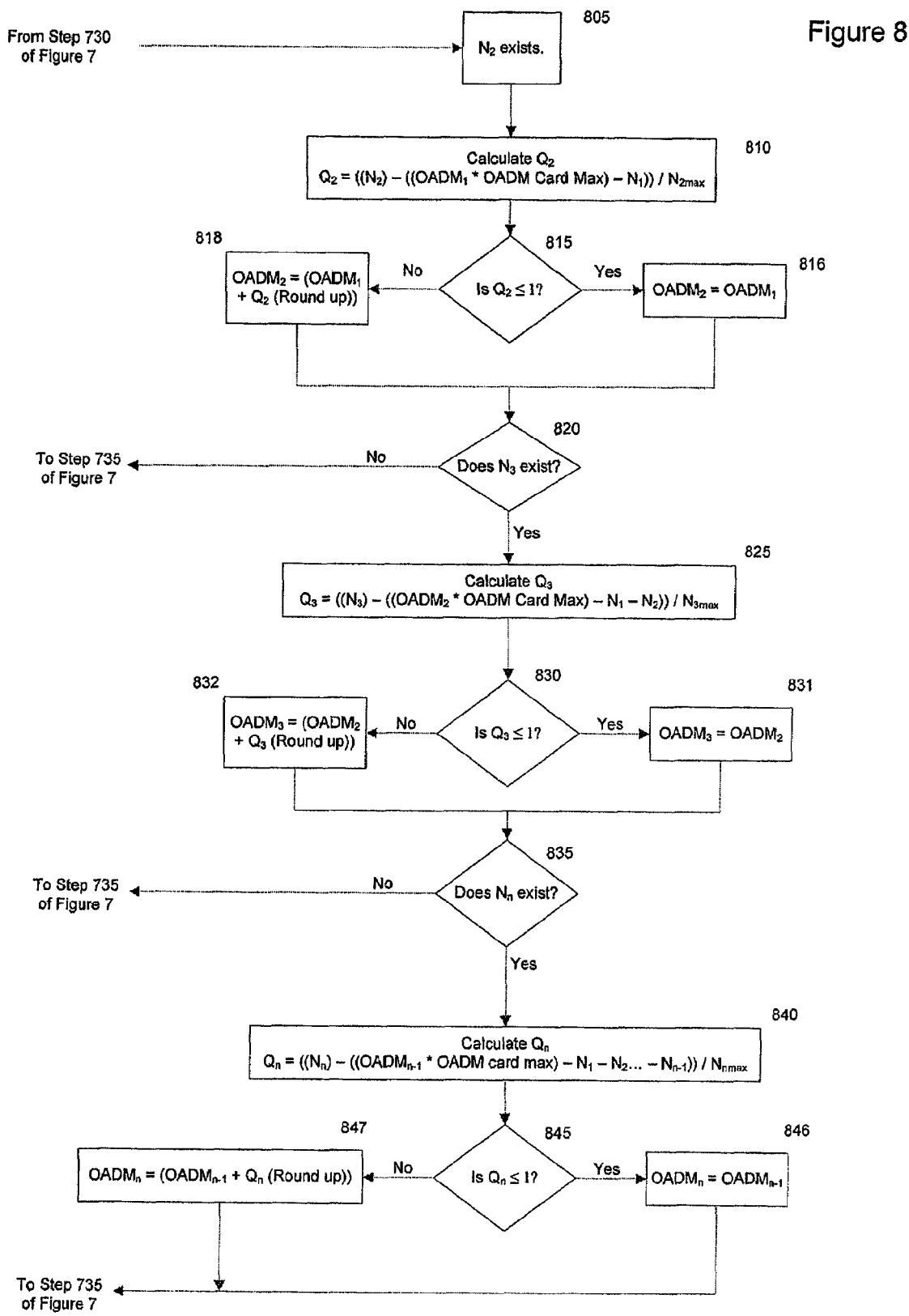
FIG. 8 is a schematic flow diagram further illustrating the OADM calculation routine depicted in FIG. 7.

In yet another embodiment of the invention, once the total numbers of ports and interface cards are determined for each traffic rate of a demand set, the total number of OADMs necessary to support such interface cards/ports should be determined. FIGS. 7 and 8 are schematic flow diagrams illustrating an OADM Calculation Routine ("OAR") for calculating a total number of OADMs in accordance with one embodiment of the invention. As used herein, the term "IC" refers to interface card, the term "IC card max" refers to the maximum number of interface cards of a given type that are supported by the OADM product (i.e., see reference number 280 of FIG. 2), and the term "OADM card max" refers to the maximum number of interface cards of any type that are supported by a given OADM product (i.e., see reference number 220 of FIG. 2).

Referring to FIG. 7, the depicted routine begins at step 705 by determining the number of ICs needed for each traffic rate of a demand set within a region of interest. At step 710, the number of ICs needed for each traffic rate is compared to corresponding IC card max values for each traffic rate and the total number of ICs for all traffic rates of the demand set ("combined # of ICs") is compared to the OADM card max value. If the number of ICs needed for each traffic rate is less than or equal to a corresponding IC card max value for each traffic rate AND the combined # of ICs is less than or equal to the OADM card max value, then the OAR proceeds to step 712 and one OADM is sufficient to service the demand set.

Alternatively, the depicted OAR proceeds to step 715 and determines whether the number of ICs needed for each traffic rate is less than or equal to a corresponding IC card max value for each traffic rate AND the combined # of ICs is greater than the OADM card max value. If each of these conditions is true, the depicted OAR proceeds to step 717 and the total number of OADMs needed to service the demand set is equal to the combined # of ICs divided by the OADM card max value, rounded up to the nearest integer.

If it is determined at step 720 that the number of ICs needed for each traffic rate is greater than a corresponding IC card max value for each traffic rate, then the depicted OAR proceeds to step 725 where an $OADM_1$ value is calculated. As used herein, the term "$OADM_1$" refers to a ratio $N_1/N_{1max}$, rounded up to the nearest integer; the term "$N_1$" refers to the calculated number of ICs for the largest traffic rate of the demand set; and the term $N_{1max}$ refers to the maximum number of ICs supported by the OADM having a traffic rate of the type associated with $N_1$.

Once an $OADM_1$ value is calculated, the OAR checks at step 730 whether an $N_2$ value exists. As used herein, the term "$N_2$" refers to the calculated number of ICs for the second largest traffic rate of the demand set. If $N_2$ does not exist (i.e., there is no second highest traffic rate in the demand set), then the depicted OAR proceeds directly to step 735, which is described in greater detail below. However, if an $N_2$ value exists, the OAR proceeds to step 805 of FIG. 8.

In one embodiment, the depicted OAR uses the $N_2$ value at step 810 to calculate a value $Q_2$, which is ultimately used to determine an $OADM_2$ value. Value $Q_2$ is based on the expression provided below:

$$Q_2 = ((N_2) - ((OADM_1 * OADM \text{ card max}) - N_1))/N_{2max}$$

As used herein, the term $N_{2max}$ refers to the maximum number of ICs supported by the OADM having a traffic rate of the type associated with $N_2$. Once a $Q_2$ value is calculated, the depicted OAR determines whether the calculated value $Q_2$ is less than or equal to one (1) at step 815. If $Q_2$ is less than or equal to one (1), then $OADM_2$ is equal to $OADM_1$ as shown at step 816. If $Q_2$ is greater than one (1), then $OADM_2$ is equal to the sum of $OADM_1$ and $Q_2$, rounded up to the nearest integer.

Once $OADM_2$ is determined, the OAR checks at step 820 whether an $N_3$ value exists. As used herein, the term "$N_3$" refers to the calculated number of ICs for the third largest traffic rate of the demand set. If $N_3$ does not exist (i.e., there is no third highest traffic rate in the demand set), then the OAR proceeds directly to step 735 of FIG. 7 as described in greater detail below. However, if an $N_3$ value exists, the depicted OAR proceeds to step 825 of FIG. 8.

In one embodiment, the depicted OAR uses the $N_3$ value at step 825 to calculate a value $Q_3$, which is ultimately used to determine an $OADM_3$ value. Value $Q_3$ is based on the expression provided below:

$$Q_3 = ((N_3) - ((OADM_2 * OADM \text{ card max}) - N_1 - N_2))/N_{3max}$$

As used herein, the term $N_{3max}$ refers to the maximum number of ICs supported by the OADM having a traffic rate of the type associated with $N_3$. The depicted OAR next determines whether $Q_3$ is less than or equal to one (1) at step 830. If yes, then $OADM_3$ is equal to $OADM_2$ as shown at step 831. If no, then $OADM_3$ is equal to the sum of $OADM_2$ and $Q_3$, rounded up to the nearest integer.

Once $OADM_3$ is determined, the depicted OAR continues checking at step 835 for all remaining $N_n$ values and calculating at step 840 corresponding $Q_n$ values based on the expression provided below:

$$Q_n = ((N_n) - ((OADM_{n-1} * OADM \text{ card max}) - N_1 - N_2 \ldots - N_{n-1}))/N_{nmax}$$

As will be apparent in view of this disclosure, the depicted OAR determines whether each calculated $Q_n$ value is less than or equal to one (1) as exemplified by step 845. If the calculated $Q_n$ value is less than or equal to one, then each $OADM_n$ value corresponding to each $Q_n$ value is equal to $OADM_{n-1}$ as shown at step 846. If the calculated $Q_n$ value is greater than one, then each $OADM_n$ corresponding to each $Q_n$ value is equal to the sum of $OADM_{n-1}$ and $Q_n$, rounded up to the nearest integer. Once all values $OADM_{1 \ldots n}$ have been calculated, the depicted OAR returns to step 735 of FIG. 7 as shown.

Referring to step 735 of FIG. 7, in one embodiment, the total number of OADMs needed to service a given set of demands is the greater of: (1) the sum of all $OADM_{1 \ldots n}$; and (2) the combined # of ICs divided by OADM card max.

OAR's provided in accordance with various embodiments of the invention may also be represented as a series of if-then-else and/or logic statements. For example, the OAR illustrated in FIGS. 7 and 8 may be simplified or reduced to include at least the following logic statements:

1. If calculated # of ICs for each type ≤ IC card max and
    total # of ICs of all types ≤ OADM card max,
       then one OADM is enough
    Stop
2. If calculated # of ICs for each type ≤ IC card max and
    total # of ICs of all types > OADM card max,
       then # of OADMs = (total # of ICs of all types) /
       (OADM card max)
          (Rounded up to the next higher integer)
    Stop
3. If calculated # of ICs for each type > IC card max,
    then follow step 3.1 below.
    3.1 Start with $N_1$
       $OADM_1 = N_1/N_1 \text{max}$ (Rounded up to the nearest integer)
    3.2 If $N_2$ exists, then check
       $Q_2 = ((N2) - ((OADM_1 * OADM \text{ card max}) - N_1)) / N_{2max}$
       If $Q_2 \leq 1$, then $OADM_2 = OADM_1$
          else $OADM_2 = (OADM_1 + Q_2$ (Rounded up to the nearest integer))
    3.3 If $N_3$ exists, then check
       $Q_3 = ((N_3) - ((OADM_2 * OADM \text{ card max}) - N_1 - N_2)) / N_{3max}$
       If $Q_3 \leq 1$, then $OADM_3 = OADM_2$
          else $OADM_3 = (OADM_2 + Q_3$ (Rounded up to the nearest integer))
    Similarly if $N_4, N_5, \ldots N_n$, exist, then calculate $OADM_4$,
    $OADM_5, \ldots OADM_n$
       then follow step 4.
4 # of OADMs is the greater of:
    $\Sigma OADM_{1 \ldots n}$ or (total # of ICs of all types) / (OADM card max)
    End Cost Computation and Analysis DWDM optical fiber network planning methods structured in accordance with various embodiments of the present invention may also include a cost computation and analysis step. For example, in one embodiment, an OADM cost may be calculated for each OADM needed to service one or more nodes of an optical fiber network. The OADM cost may include without limitation any of the costs listed in the OADM Equipment and Cost Template shown in FIG. 2 (e.g., the Base Cost 205, Card Costs 260, various costs that are dependent on the number of activated OADM wavelengths such as those associated with reference number 210, etc.). OADM costs may be summed together with other node-related costs to determine a total node cost. Total node costs for a given DWDM network ring may be summed together with other ring-related costs to determine a total ring cost. Finally, one or more total ring costs may be summed together with other network-related costs to determine a total network cost.

DWDM optical fiber network planners may have budgets or other financial constraints related to each tier or level (e.g., OADM level, node level, ring level, network level, etc.) of the optical fiber network. In various embodiments, a DWDM optical fiber network planner may use the methods described herein to create a network configuration having various associated costs (e.g., OADM cost, total node costs, total ring costs, total network costs, etc.) and then evaluate the created network configuration against a budget or set of financial constraints. The DWDM planner may then alter the network configuration to more efficiently operate within the budget or set of financial constraints.

Although various embodiments are specifically illustrated and described herein, it will be appreciated that modifications and variations of the present invention are covered by the above teachings and are within the purview of the appended claims without departing from the spirit and intended scope of the invention. For example, while the present invention has been discussed in terms of an optical ring network, it should be noted that the invention is also applicable to optical mesh networks and logical rings over optical mesh networks.

As will be appreciated in view of the present disclosure, various embodiments of the invention may be embodied as a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. More particularly, the present invention may take the form of web-implanted computer software. Any suitable computer-readable storage medium may be utilized including hard disks, CD-ROMs, optical storage devices, or magnetic storage devices.

The present invention is described above with reference to various decision criteria, guidelines, algorithms, and routines. It will be understood that each decision criterion, guideline, rule, algorithm, or routine can be implemented by computer program instructions. These computer program instructions may be loaded onto a general purpose computer, special purpose computer, or other programmable data processing apparatus to produce a machine, such that instructions which are executed on the computer or other programmable data processing apparatus create means for implementing the function or functions specified above.

These computer program instructions may also be stored in a computer-readable memory that can direct a computer or other programmable data processing apparatus to function in a particular manner, such that the instructions stored in the computer-readable memory produce a DWDM network planning method including instruction means that implement the functions specified above. The computer program instructions may also be loaded onto a computer or other programmable data processing apparatus to cause a series of operational steps to be performed on the computer or other programmable apparatus to produce a computer implemented process such that the instructions that execute on the computer or programmable apparatus provide steps for implementing the function specified.

Figure 9:
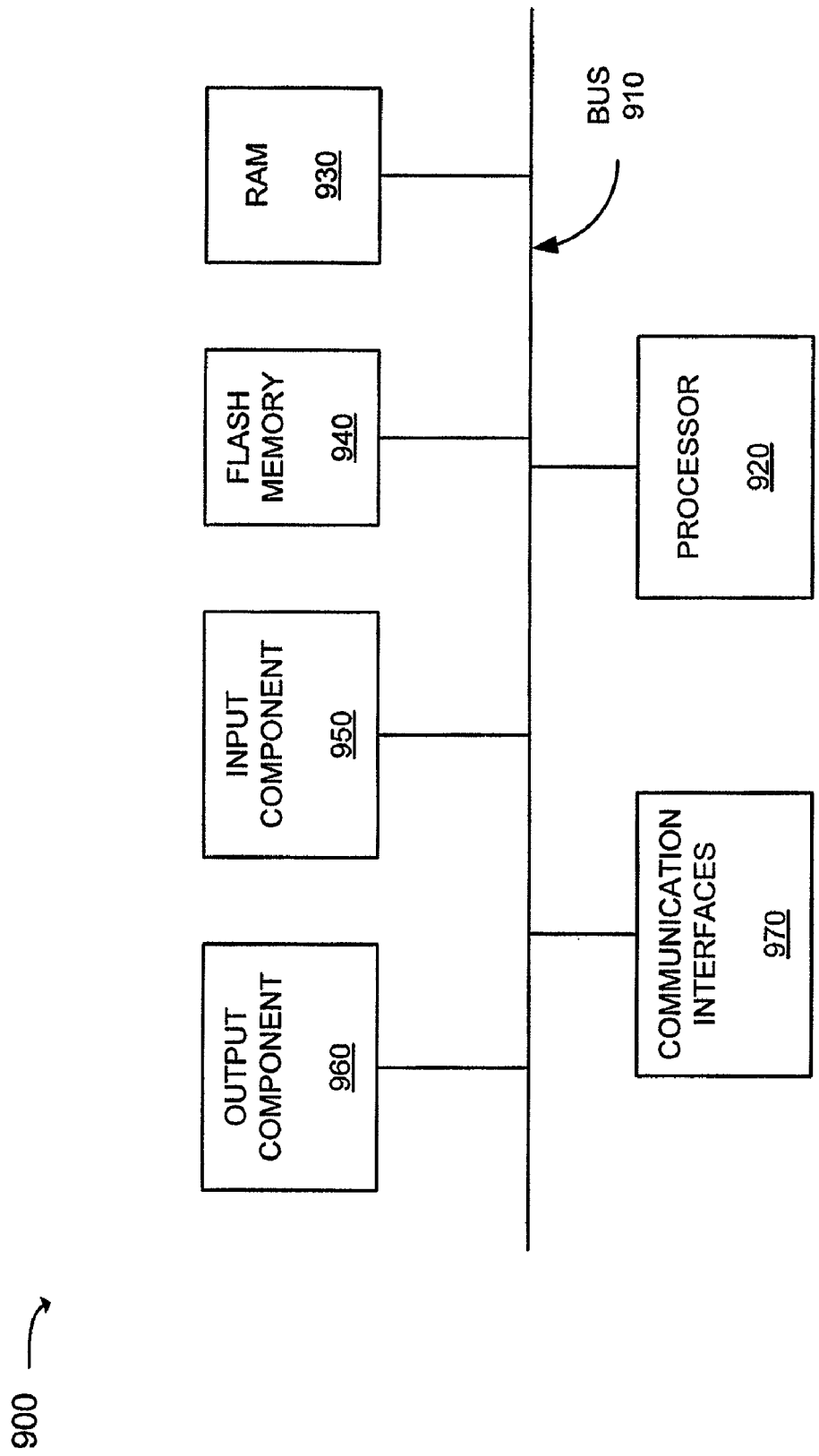
FIG. 9 is a schematic block diagram of an exemplary computer system that may be adapted to perform optical fiber network planning methods in accordance with various embodiments of the invention.

FIG. 9 is an exemplary diagram of components for a DWDM network planning apparatus 900 structured in accordance with various embodiments of the present invention. The apparatus 900 may include a bus 910, a processor 920, a random access memory 930, a flash memory 940, an input component 950, an output component 960, and communication interfaces 970. Bus 910 may include a path that permits communication among the elements of the apparatus 900.

Processor 920 may include a processor, microprocessor, or processing logic that may interpret and execute instructions. RAM 930 may include any type of dynamic storage device that may store information and instructions for execution by processor 920. Flash memory 940 may include any type of non-volatile storage device that may store information for use by processor 920.

Input component 950 may include a mechanism that permits an operator to input information to the apparatus 900, such as a button, switch, input key, etc. Output component 960 may include a mechanism that outputs information to the operator, such as a display, a report, a print-out, etc. Communication interfaces 970 may include any transceiver-like mechanisms that enable the apparatus 900 to communicate with other devices and/or systems. For example, communication interfaces 970 may include one or more Ethernet interfaces, optical interfaces, coaxial interfaces, or the like.

As will be apparent in view of the present disclosure, apparatus 900 may perform one or more of the optical fiber network planning methods and operations described above.

The apparatus 900 may perform these methods and/or operations in response to processor 920 executing software instructions contained in a computer-readable medium, such as RAM 930. A computer-readable medium may be defined as a physical or logical memory device and/or carrier wave.

The software instructions may be read into RAM 930 from another computer-readable medium, such as flash memory 940, or from another device via communication interfaces 970. The software instructions contained in RAM 930 may cause processor 920 to perform processes that will be described later. Alternatively, hardwired circuitry may be used in place of or in combination with software instructions to implement processes described herein. Thus, implementations described herein are not limited to any specific combination of hardware circuitry and software.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for DWDM network planning, the method comprising:
   determining a highest aggregate demand from among a set of demands associated with a region of interest;
   determining a total number of lightpaths at discrete line granularities beginning with the highest aggregate demand;
   determining a DWDM network topology comprised of a plurality of nodes and one or more wavelengths extending between the nodes based on the total number of lightpaths at discrete line granularities;
   routing lightpaths along the wavelengths extending between the plurality of nodes based at least on predetermined decision criteria;
   routing demands onto tributaries extending along the lightpaths based at least on predetermined guidelines;
   determining node-related hardware parameters based at least on a predetermined routine;
   calculating a cost associated with the node-related hardware parameters; and
   outputting the node-related hardware parameters and the associated cost.

2. The method of claim 1, wherein determining a highest aggregate demand comprises normalizing the set of demands into a single traffic rate.

3. The method of claim 1, wherein determining a highest aggregate demand comprises normalizing the set of demands into an OC48 traffic rate.

4. The method of claim 1, wherein determining a highest aggregate demand comprises determining aggregated protection level demands for each of the set of demands using a weight factor for protected demands.

5. The method of claim 4, wherein determining a highest aggregate demand comprises summing the aggregated protection level demands to produce an aggregate demand for each of the set of demands.

6. The method of claim 5, wherein determining a highest aggregate demand further comprises comparing the aggregate demand for each of the set of demands.

7. The method of claim 1, wherein determining a total number of lightpaths at discrete line granularities comprises comparing traffic rates associated with each demand of the set of demands with predetermined OADM product information.

8. The method of claim 1, wherein the step of calculating node-related hardware parameters comprises calculating a number of interface card ports, calculating a number of interface cards, and calculating a number of OADMs.

9. The method of claim 8, wherein calculating a number of interface cards comprises comparing a number of interface card ports with predetermined OADM product information.

10. A method for DWDM network planning, the method comprising:
    determining a total number of lightpaths at discrete line granularities based on a set of demands associated with a region of interest;
    determining a DWDM network topology comprised of a plurality of nodes and one or more wavelengths extending between the nodes based on the total number of lightpaths at discrete line granularities;
    routing lightpaths along the wavelengths extending between the plurality of nodes based at least on predetermined decision criteria;
    routing demands onto tributaries extending along the lightpaths based at least on predetermined guidelines;
    determining node-related hardware parameters based at least on a predetermined routine comprising: calculating a number of interface card ports, calculating a number of interface cards, and calculating a number of OADMs;
    calculating a cost associated with the node-related hardware parameters; and
    outputting the node-related hardware parameters and the associated cost.

11. The method of claim 10, wherein calculating a number of interface cards comprises comparing a calculated number of interface card ports with predetermined OADM product information.

12. The method of claim 11, wherein the step of calculating a number of interface cards comprises dividing the calculated number of interface card ports by a predetermined number of ports per interface card.

13. The method of claim 10, further comprising determining a highest aggregate demand from among the set of demands associated with the region of interest.

14. The method of claim 13, wherein determining a total number of lightpaths at discrete line granularities begins with the highest aggregate demand.

15. The method of claim 13, wherein determining a highest aggregate demand comprises normalizing the set of demands into a single traffic rate.

16. The method of claim 13, wherein determining a highest aggregate demand comprises normalizing the set of demands into an OC48 traffic rate.

17. The method of claim 13, wherein determining a highest aggregate demand comprises determining aggregated protection level demands for each of the set of demands using a weight factor for protected demands.

18. The method of claim 17, wherein determining a highest aggregate demand comprises summing the aggregated protection level demands to produce an aggregate demand for each of the set of demands.

19. The method of claim 18, wherein determining a highest aggregate demand comprises comparing the aggregate demand for each of the set of demands to produce the highest aggregate demand.

20. An apparatus for DWDM network planning comprising:
    a processor;
    a memory for storing data coupled to the processor; and
    a display coupled to the processor for displaying data,
    wherein the processor is configured for:
        determining a highest aggregate demand from among a set of demands associated with a region of interest,
        determining a total number of lightpaths at discrete line granularities beginning with the highest aggregate demand,
        determining a DWDM network topology comprised of a plurality of nodes and one or more wavelengths extending between the nodes based on the total number of lightpaths at discrete line granularities,
        routing lightpaths along the wavelengths extending between the plurality of nodes based at least on predetermined decision criteria,
        routing demands onto tributaries extending along the lightpaths based at least on predetermined guidelines,
        calculating node-related hardware parameters based at least on a predetermined routine,
        calculating a cost associated with the node-related hardware parameters, and
        outputting the node-related hardware parameters and the associated cost to the display.

21. The apparatus of claim 20, wherein the processor is further configured for normalizing the set of demands into a single traffic rate.

22. The apparatus of claim 20, wherein the processor is further configured for determining aggregated protection level demands for each of the set of demands using a weight factor for protected demands.

23. The apparatus of claim 22, wherein the processor is further configured for summing the aggregated protection level demands to produce an aggregate demand for each of the set of demands.

24. The apparatus of claim 23, wherein the processor is further configured for comparing the aggregate demand for each of the set of demands to produce the highest aggregate demand.

25. The apparatus of claim 20, wherein the processor is further configured for comparing traffic rates associated with each demand of the set of demands with predetermined OADM product information.

* * * * *